US012472563B2

(12) United States Patent
Yanagihara et al.

(10) Patent No.: US 12,472,563 B2
(45) Date of Patent: Nov. 18, 2025

(54) TOOL BRACKET

(71) Applicant: SUGINO MACHINE LIMITED, Namerikawa (JP)

(72) Inventors: Yusuke Yanagihara, Namerikawa (JP); Akihiro Ishitani, Namerikawa (JP); Mitsuru Muto, Namerikawa (JP)

(73) Assignee: SUGINO MACHINE LIMITED, Namerikawa (JP)

( * ) Notice: Subject to any disclaimer, the term of this patent is extended or adjusted under 35 U.S.C. 154(b) by 0 days.

(21) Appl. No.: 18/759,763

(22) Filed: Jun. 28, 2024

(65) Prior Publication Data

US 2025/0025943 A1    Jan. 23, 2025

(30) Foreign Application Priority Data

Jul. 20, 2023    (JP) .................................. 2023-118061

(51) Int. Cl.
*B23B 31/02*    (2006.01)
*B23B 29/04*    (2006.01)
(Continued)

(52) U.S. Cl.
CPC .......... *B23B 31/026* (2013.01); *B23B 29/046* (2013.01); *B23B 29/12* (2013.01);
(Continued)

(58) Field of Classification Search
CPC ... B23B 31/08; B23B 2220/08; B23B 51/101; B23Q 3/12; Y10T 279/17017; Y10T 408/665; Y10T 409/309408
See application file for complete search history.

(56) References Cited

U.S. PATENT DOCUMENTS 1,782,633 A * 11/1930 Schiltz ................... B23B 31/08
408/127
3,359,008 A * 12/1967 Stimmerman .......... B23B 31/08
408/127
(Continued)

FOREIGN PATENT DOCUMENTS

CN    106217246 A  * 12/2016
DE    3042939 A1     6/1981
(Continued)

OTHER PUBLICATIONS

Extended European Search Report mailed on Dec. 9, 2024 in a corresponding European Patent Application No. 24183109.8 (7 pages).

*Primary Examiner* — Nicole N Ramos
(74) *Attorney, Agent, or Firm* — United IP Counselors, LLC

(57) ABSTRACT

Provided is a tool bracket in which a spindle body is inserted and the spindle body can be smoothly tilted. The tool bracket includes a housing including a cylinder chamber extending along a cylinder axis; a tilting body having a tilt axis configured to tilt about a tilt center, the tilting body to which a spindle body is attachable, the tilting body tiltable with respect to the cylinder axis; a rotation stopper member extending in a radial direction from the tilt axis, the rotation stopper member disposed in the tilting body; and a receiving groove extending along the cylinder axis, the receiving groove arranged in the housing.

8 Claims, 5 Drawing Sheets

(51) Int. Cl.
  *B23B 29/12*  (2006.01)
  *B23B 31/36*  (2006.01)
  *B23B 51/10*  (2006.01)

(52) U.S. Cl.
  CPC ............ *B23B 31/36* (2013.01); *B23B 51/101* (2013.01); *B23B 51/104* (2013.01)

(56) References Cited

U.S. PATENT DOCUMENTS

| | | | | |
|---|---|---|---|---|
| 4,332,066 | A | * | 6/1982 | Hailey .................. B23Q 35/02 901/41 |
| 4,439,075 | A | | 3/1984 | Wiederkehr |
| 4,984,942 | A | * | 1/1991 | Holtz ...................... B23B 31/08 408/127 |
| 6,352,394 | B1 | | 3/2002 | Lawson et al. |
| 7,726,919 | B1 | * | 6/2010 | Rottler .................. B23C 3/056 408/127 |
| 2005/0180829 | A1 | | 8/2005 | Lawson |
| 2013/0192059 | A1 | * | 8/2013 | Steger ....................... B23C 3/12 29/650 |

FOREIGN PATENT DOCUMENTS

| | | |
|---|---|---|
| JP | 2022-074292 A | 5/2022 |
| KR | 102147044 B1 | 8/2020 |

\* cited by examiner

TOOL BRACKET

CROSS-REFERENCE TO RELATED APPLICATIONS

This application claims the benefit of priority to Japanese Patent Application No. 2023-118061, filed on Jul. 20, 2023, the entire contents of which are hereby incorporated by reference.

BACKGROUND

1. Technical Field

The present invention relates to a tool bracket.

2. Description of the Background

A deburring tool capable of tilting a tool has been proposed (JP2022-074292 A; hereinafter, Patent Literature 1). The deburring tool 100 of Patent Literature 1 includes a housing 1 having a shank 11 disposed along a shank axis 15, a transmission rod 3, a tilting shaft 4, and a tilt correction mechanism 9. The tilting shaft 4 includes a flange portion 41, a receiving portion 41a through which the transmission rod passes, a rod portion 42 holding the cutter 101, and a spherical bush 24 having a tilting center 25 on the shank axis 15. The tilting shaft 4 can be tilted about a tilting center 25.

BRIEF SUMMARY

The deburring tool of Patent Literature 1 is mounted on a rotating spindle of a machining center or the like. The deburring tool of Patent Literature 1 thus cannot be applied to, for example, a robot that does not have a rotating spindle.

An object of the present invention is to provide a tool bracket in which a spindle body is inserted and the spindle body can be smoothly tilted.

A first aspect of the present invention provides a tool bracket, including:
- a housing including a cylinder chamber extending along a cylinder axis;
- a tilting body having a tilt axis configured to tilt about a tilt center, the tilting body to which a spindle body is attachable, the tilting body tiltable with respect to the cylinder axis;
- a rotation stopper member extending in a radial direction from the tilt axis, the rotation stopper member disposed in the tilting body; and
- a receiving groove extending along the cylinder axis, the receiving groove arranged in the housing.

A second aspect of the present invention provides a tool bracket, including:
- a housing including a cylinder chamber extending along a cylinder axis;
- a piston including an action portion disposed in a distal end portion, the piston configured to be urged toward a distal end by compressible fluid to reciprocate in the cylinder chamber,
- a tilting body having a tilt axis, the tilting body disposed in the cylinder chamber, the tilting body tiltable with respect to the cylinder axis, the tilting body including a centering portion disposed in the cylinder chamber to abut against the action portion, the centering portion configured to press the piston with the cylinder axis as an action line when the tilt axis is tilted from the cylinder axis.

The tool bracket according to the present invention allows the spindle body to be inserted and to be smoothly tilted.

DETAILED DESCRIPTION

First Embodiment

Figure 1:
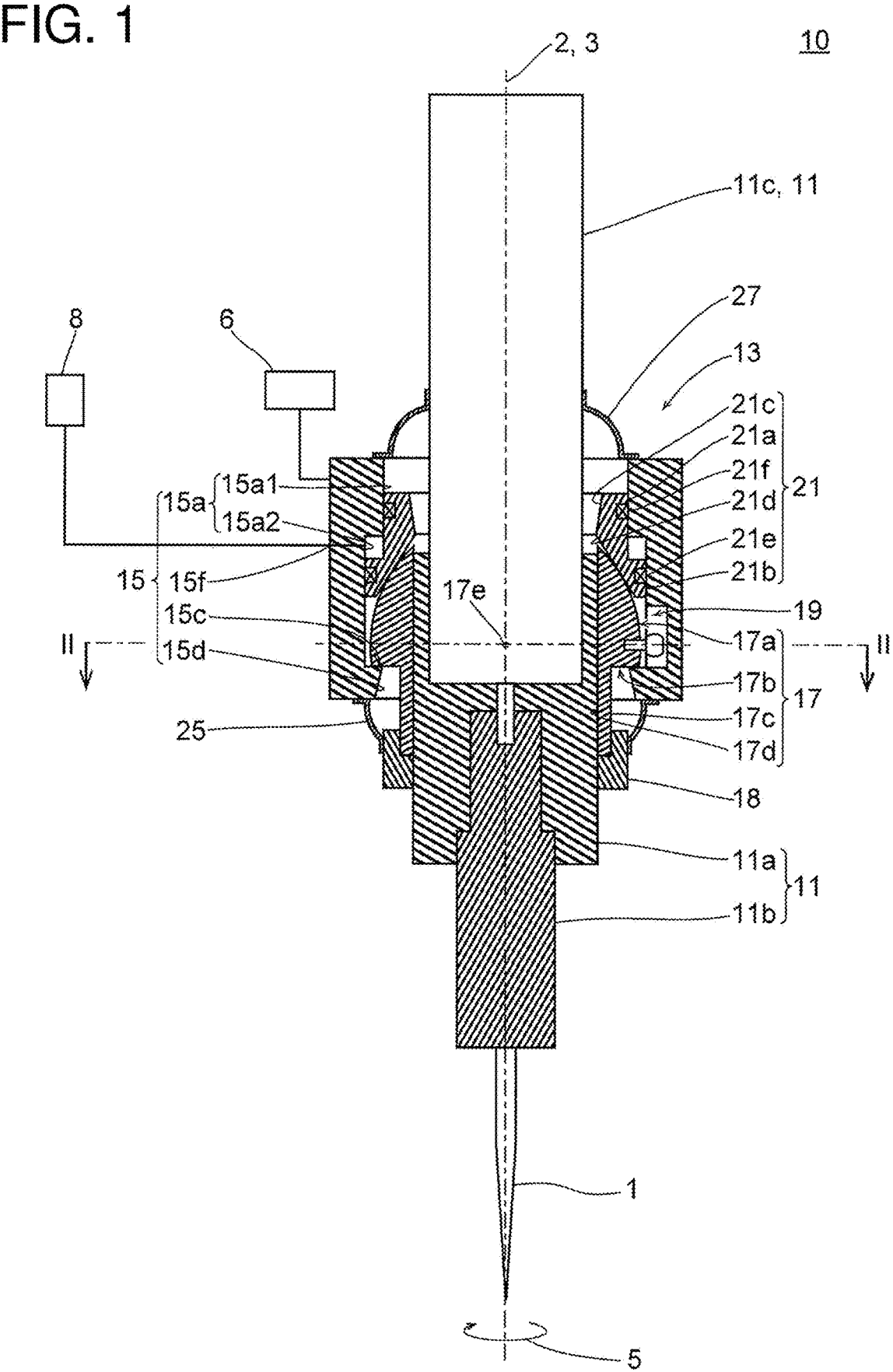
FIG. 1 is a longitudinal sectional view of a deburring tool according to a first embodiment in a non-tilted state.

As shown in FIG. 1, a deburring tool 10 according to the present embodiment includes a tool bracket 13 and a spindle body 11. FIG. 1 is a sectional view taken along line I-I in FIG. 2. FIG. 1 shows a state in which the spindle body 11 is not tilted. In FIG. 1, a cylinder axis 2 (see FIG. 4) and a tilt axis 3 (see FIG. 4) coincide with each other.

The deburring tool 10 is connected to a robot 6 and an air source 8.

The tool bracket 13 includes a housing 15, a piston 21, a tilting body 17, a coupling 18, a rotation stopper 19, a basal end cover 27, and a distal end cover 25.

The housing 15 has a hollow shape. The piston 21, the tilting body 17, and the rotation stopper 19 are disposed inside the housing 15 from the basal end.

Figure 2:
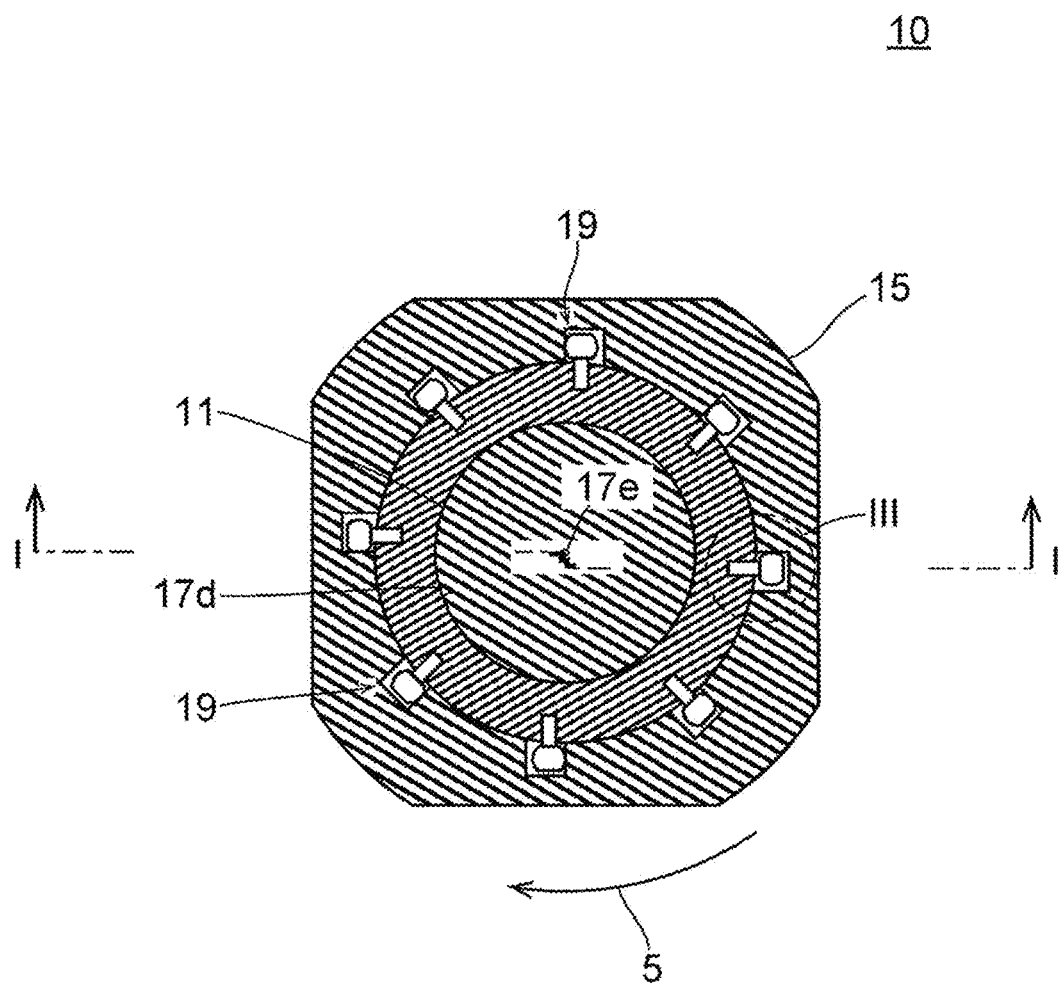
FIG. 2 is a cross-sectional view taken along line II-II in FIG. 1.

The housing 15 has a cylinder chamber 15a, a seat surface 15c, and a distal end opening 15d in this order from a basal end. The housing 15 is attached to, for example, a distal end of an arm of the robot 6. As shown in FIG. 2, the housing 15 may have a rectangular parallelepiped outer shape. The cylinder chamber 15a is disposed around the cylinder axis 2. As shown in FIG. 1, the cylinder chamber 15a includes a cylinder portion 15a2 and a small-diameter guide portion 15a1. The cylinder portion 15a2 is disposed in a central portion of the housing 15. The small-diameter guide portion 15a1 has a diameter smaller than the cylinder portion 15a2. The small-diameter guide portion 15a1 is connected to the cylinder portion 15a2 and opens to the basal end of the housing 15. The seat surface 15c is disposed at a distal end portion of the housing 15. The seat surface 15c is a plane perpendicular to the cylinder axis 2. The seat surface 15c is connected to the cylinder chamber 15a via the rotation stopper 19. The distal end opening 15d opens from the seat surface 15c to the distal end of the housing 15. Preferably, the distal end opening 15d increases in diameter toward the distal end.

The housing 15 has a fluid-port 15f. The fluid-port 15f is connected to the cylinder portion 15a2. The fluid-port 15f is connected to the air source 8. The air source 8 supplies compressed air to the cylinder portion 15a2 via the fluid-port 15f.

The piston 21 has a hollow cylindrical shape. The piston 21 includes a head portion 21b, a sleeve 21a, a recess (action portion) 21d, a basal end opening 21c, a seal 21e, and a seal 21f. The head portion 21b, which is a hollow-cylinder, reciprocates in the cylinder portion 15a2. The recess 21d has a larger diameter toward the distal end. The recess 21d is, for example, a conical surface centered on the cylinder axis 2. The sleeve 21a is connected to the basal end of the head portion 21*b*. The sleeves 21*a* are guided to the small-diameter guide portion 15*a*1. The basal end opening 21*c* is an inner surface of the sleeve 21*a*. The basal end opening 21*c* may also be a conical surface with a larger diameter toward the basal end. The basal end opening 21*c* is connected to the recess 21*d*. The seal 21*e* is mounted on an outer cylindrical surface of the head portion 21*b*. The seal 21*f* is mounted on an outer cylindrical surface of the sleeve 21*a*.

The tilting body 17 is hollow cylindrical or spherical. The tilting body 17 has a convex spherical surface (centering portion) 17*a*, a head surface 17*b*, a sleeve 17*c*, and an insertion hole 17*d*. The convex spherical surface 17*a* is disposed at a basal end portion of the tilting body 17. The convex spherical surface 17*a* comes into contact with and slides on the recess 21*d*. The convex spherical surface 17*a* has a tilt center 17*e*. The tilt center 17*e* is the center of the convex spherical surface 17*a*. The tilt axis 3 passes through the tilt center 17*e*. The head surface 17*b* is located at a distal end portion of the tilting body 17. The head surface 17*b* is, for example, a flat surface. The head surface 17*b*, which is a flat surface, is perpendicular to the tilt axis 3. The sleeve 17*c* extends toward the distal end from the head surface 17*b*. The sleeve 17*c* is a hollow right cylinder. The insertion hole 17*d* is an inner surface of the sleeve 17*c*. The insertion hole 17*d* passes through the tilting body 17 around the tilt axis 3. The insertion hole 17*d* is a cylindrical hole.

The spindle body 11 is inserted into the insertion hole 17*d*. The spindle body 11 passes through the tool bracket 13. The spindle body 11 includes a body 11*a*, a spindle 11*b*, and a spindle motor 11*c*. The spindle 11*b* is rotatably supported on the body 11*a* about the tilt axis 3. A tip tool 1 is attached to the spindle 11*b*. The spindle motor 11*c*, which is disposed in the body 11*a*, is connected to the spindle 11*b*. For example, the spindle motor 11*c* rotates the spindle 11*b* in the rotational direction 5 (counterclockwise as viewed from the distal end).

The coupling 18 has a hollow cylindrical shape. The coupling 18 fastens the sleeve 17*c* to the spindle body 11. The coupling 18 is, for example, a rigid coupling.

Figure 3:
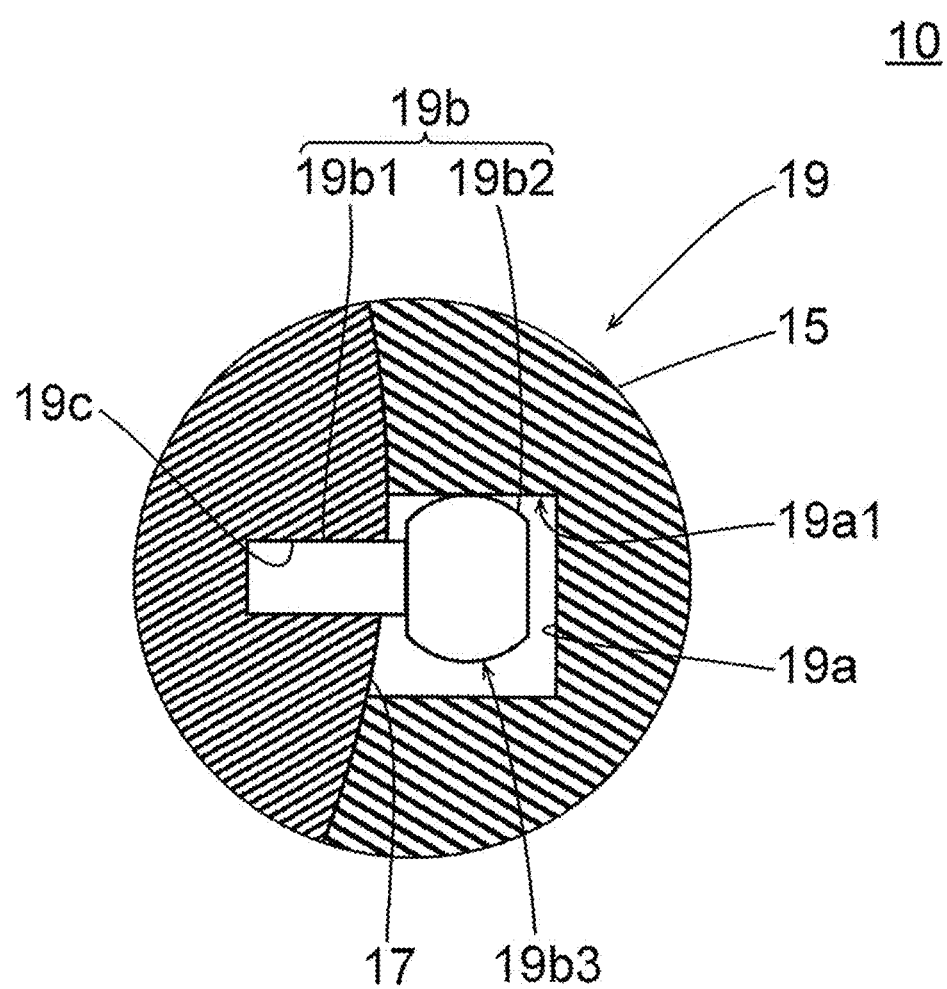
FIG. 3 is an enlarged view of part III in FIG. 2.

As shown in FIGS. 1 to 3, the rotation stopper 19 includes a plurality of receiving grooves 19*a*, a plurality of rotation stopper pin (rotation member) 19*b*, and a pin hole 19*c*.

The plurality of receiving grooves 19*a* are arranged rotationally symmetrically with respect to the cylinder axis 2 in the inner diameter portion of the housing 15. Each receiving groove 19*a* is a square groove extending parallel to the cylinder axis 2 and has a rectangular cross section. An abutment surface 19*a*l is a side of the receiving groove 19*a* opposite to the rotational direction 5. The abutment surface 19*a*l is a plane passing through the cylinder axis 2.

A plurality of the pin holes 19*c* are arranged on the tilting body 17. Each of the pin hole 19*c* extends through the tilt center 17*e* and parallel to the abutment surface 19*a*l on a plane perpendicular to the tilt axis 3. The pin hole 19*c* is a cylindrical hole.

The rotation stopper 19 has the same number of rotation stopper pins 19*b* as the receiving grooves 19*a*. The plurality of rotation stopper pins 19*b* are arranged rotationally symmetrically with respect to the tilt axis 3. The rotation stopper pin 19*b* includes a shaft 19*b*1 and a bulging portion 19*b*2. The shaft 19*b*1 is inserted into the pin hole 19*c*. The bulging portion 19*b*2 protrudes radially from the tilting body 17. A play (gap) is provided between the bulging portion 19*b*2 and the receiving groove 19*a*. Preferably, the rotation stopper pin 19*b* has an abutting spherical surface 19*b*3.

The basal end cover 27 covers between the basal end surface of the housing 15 and the spindle body 11. The basal end cover 27 prevents foreign matter, cutting coolant, or the like from entering between the cylinder chamber 15*a*, the basal end opening 21*c*, and the spindle body 11.

The distal end cover 25 covers between the distal end surface of the housing 15 and the spindle body 11 or the coupling 18. The distal end cover 25 prevents foreign matter, cutting coolant, or the like from entering between the spindle body 11 and the distal end opening 15*d*.

Figure 4:
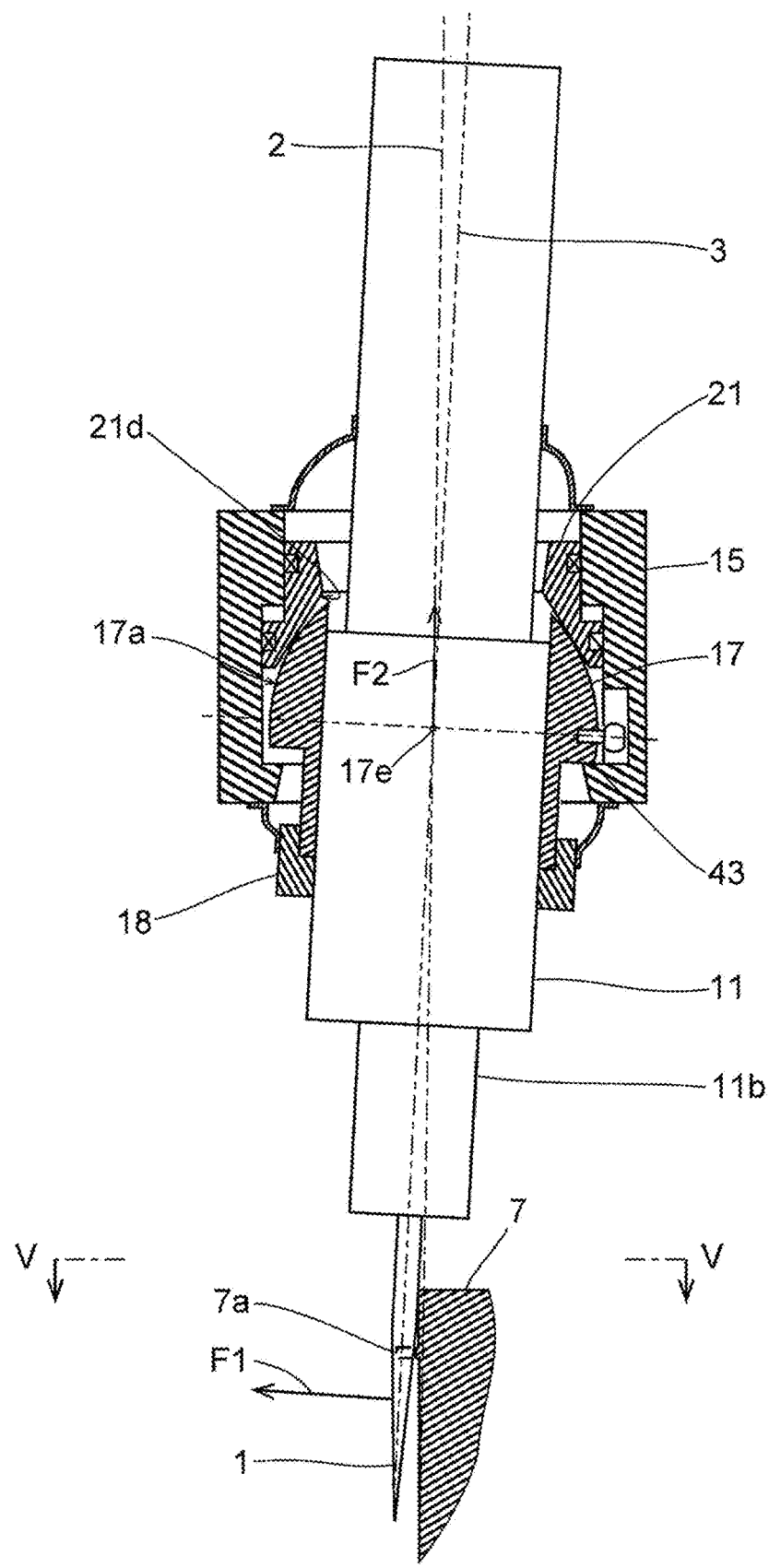
FIG. 4 is a longitudinal sectional view of the deburring tool according to the first embodiment in a tilted state.
Figure 5:
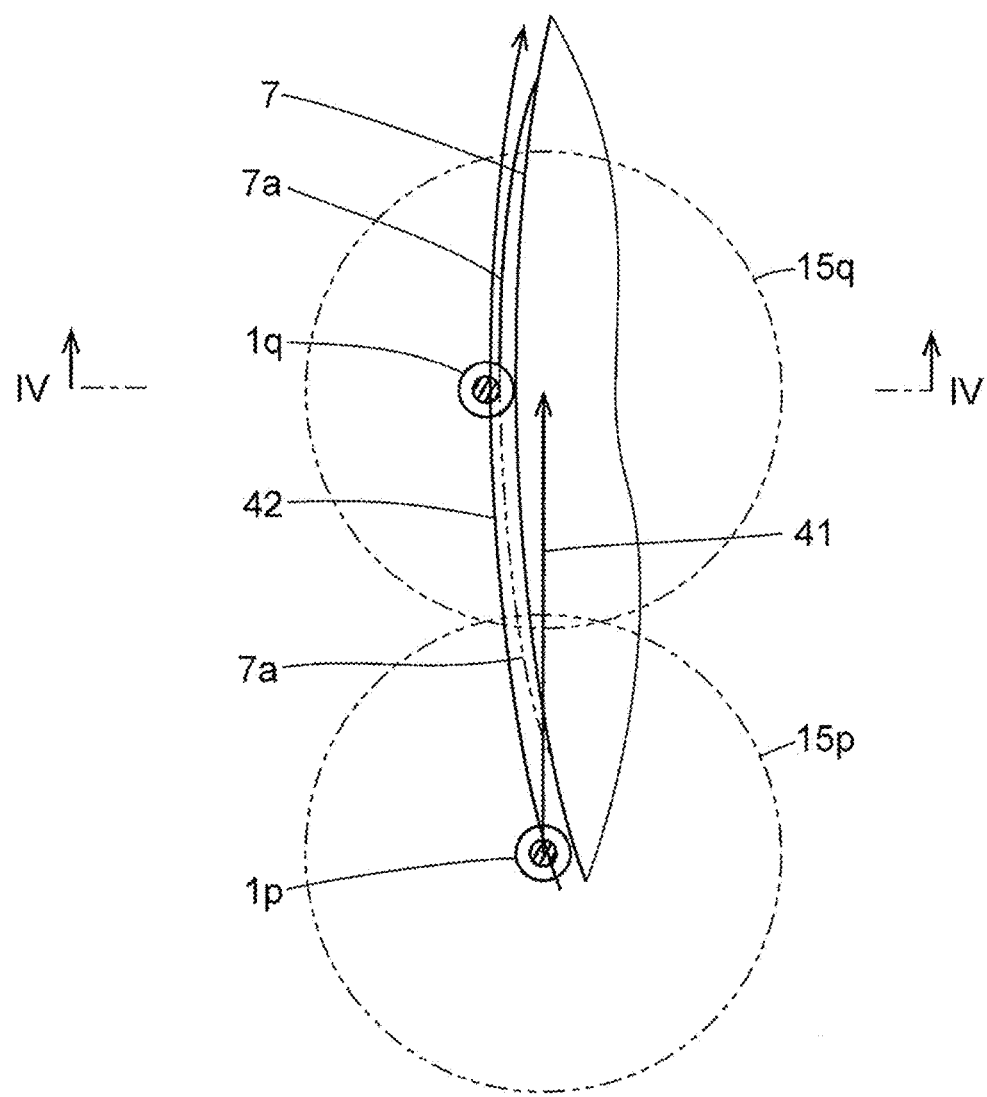
FIG. 5 is a cross-sectional view taken along line V-V in FIG. 4.

Referring to FIGS. 1 to 5, the use state of the deburring tool 10 will be described. FIGS. 4 and 5 show a situation in which the deburring tool 10 performs deburring of the workpiece 7. FIG. 4 is a sectional view taken along line IV-IV in FIG. 5. As shown in FIGS. 4 and 5, the workpiece 7 has a burr 7*a*. Here, the two-dot chain line of the burr 7*a* in FIG. 5 indicates a shape of the dropped part. The side surface of the workpiece 7 has a curved surface that is convex toward the deburring tool 10 as viewed from the basal end along the cylinder axis 2. The burr 7*a* protrudes from the side surface of the workpiece 7. The spindle 11*b* rotates in the rotational direction 5. The air source 8 supplies compressed air to the cylinder chamber 15*a*.

As shown in FIG. 1, when the tip tool 1 is separated from the workpiece 7, the tip tool 1 does not receive a large moment load F1 (see FIG. 4). The piston 21 is moved to the distal end by the compressed air supplied to the cylinder chamber 15*a*. At this time, the head surface 17*b* abuts against the seat surface 15*c*. This suppresses tilting of the spindle body 11. The tilt axis 3 substantially coincides with the cylinder axis 2. At this time, as the head surface 17*b* and the seat surface 15*c* are flat surfaces, the tilt axis 3 is easily stabilized.

When the spindle 11*b* starts to rotate, the spindle body 11 also attempts to rotate. As shown in FIG. 3, the bulging portion 19*b*2 of the rotation stopper pin 19*b* abuts on the abutment surface 19*a*l of the receiving groove 19*a* to prevent the spindle body 11 from rotating.

Next, the tip tool 1 is brought into contact with the workpiece 7 to perform deburring. As shown in FIG. 5, the robot 6 moves the housing 15 along a linear trajectory 41 from a position 15*p* toward a position 15*q*. Then, as shown in FIGS. 4 and 5, while the spindle body 11 is tilted, the tip tool 1 moves from a position 1*p* to a position 1*q* by drawing a trajectory 42 so as to trace the shape of the side surface of the workpiece 7. The tip tool 1 scrapes off the burr 7*a*.

As shown in FIG. 4, when a moment load F1 acts on the tip tool 1, the tilting body 17 and the spindle body 11 are inclined integrally with one point 43 around the head surface 17*b* as a center. Then, while the convex spherical surface 17*a* is in contact with the recess 21*d*, the piston 21 is pushed upward toward the basal end. At this time, the tilting body 17 is tilted while the convex spherical surface 17*a* slides in the recess 21*d*. The tilt center 17*e* moves along the cylinder axis 2 toward the basal end.

The recess 21*d* has a circular cross section centered on the cylinder axis 2. The convex spherical surface 17*a* and the recess 21*d* are thus substantially in contact with each other around the entire circumference. The tilting body 17 pushes up the piston 21 along the cylinder axis 2 with the tilt center 17*e* at an action point. In other words, the urging force F2 applied by the tilting body 17 to the piston 21 has the cylinder axis 2 as an action line. The air is compressible fluid. The piston 21 can thus move toward the basal end against the pressure of the compressed air supplied to the piston chamber. As the piston 21 receives the urging force F2 along the cylinder axis 2, the inclination of the piston 21 is suppressed. The piston 21 can thus smoothly move along the cylinder axis 2. The piston 21 urges the tilting body 17 toward the distal end by the pressure of the compressed air. The tilting body 17 thus remains in contact with the seat surface 15c.

When the tilt axis 3 tilts from the cylinder axis 2, the bulging portion 19b2 and the receiving groove 19a come into contact with each other while being twisted. According to the present embodiment, as the abutting spherical surface 19b3 is in point contact with the abutting surface 19a1, the contact resistivity between the bulging portion 19b2 and the receiving groove 19a is small. The tilting body 17 is thus easily tilted smoothly.

The operator teaches the robot 6 to determine the trajectory 41 and the speed of the deburring tool 10. Preferably, the teaching of the robot 6 is carried out with the tilt axis 3 substantially coinciding with the cylinder axis 2. As described above, the head surface 17b abuts against the seat surface 15c to easily stabilize the posture of the spindle body 11. The operator can thus easily teach the robot 6. Further, as the posture of the tilt axis 3 is stable when the robot 6 moves the deburring tool 10, contact of the deburring tool 10 with the workpiece 7, the safety fence, and the worker is suppressed.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

1 Tip tool
2 Cylinder axis
3 Tilt axis
7 Workpiece
11 Spindle body
13 Tool bracket
15 Housing
15a Cylinder chamber
17 Tilting body
17e Tilt center
19a Receiving groove
19b Rotation stopper member
21 Piston
21d Action portion

What is claimed is:

1. A tool bracket, comprising:
a housing including a cylinder chamber extending along a cylinder axis;
a tilting body having a tilt axis configured to tilt about a tilt center, the tilting body to which a spindle body is attachable, the tilting body tiltable with respect to the cylinder axis;
a rotation stopper member extending in a radial direction from the tilt axis, the rotation stopper member disposed in the tilting body;
a receiving groove extending along the cylinder axis, the receiving groove arranged in the housing; and
a piston including an action portion, wherein the piston is configured to be urged toward a distal end of the housing to reciprocate the piston in a direction along the cylinder axis in the cylinder chamber; and
wherein the tilting body includes a centering portion disposed in the cylinder chamber to abut against the action portion.

2. The tool bracket according to claim 1, wherein
the rotation stopper member extends in a plane that passes through the tilt center and is perpendicular to the tilt axis.

3. The tool bracket according to claim 1, wherein
the receiving groove has an abutment surface that is a plane passing through the cylinder axis.

4. The tool bracket according to claim 3, wherein
the rotation stopper member includes a bulging portion configured to abut against the abutment surface.

5. The tool bracket according to claim 4, wherein the bulging portion is spherical.

6. The tool bracket according to claim 2, wherein
the receiving groove has an abutment surface that is a plane passing through the cylinder axis.

7. The tool bracket according to claim 6, wherein
the rotation stopper member includes a bulging portion configured to abut against the abutment surface.

8. The tool bracket according to claim 1, wherein the rotation stopper member protrudes from the tilting body.

* * * * *